C. E. HOPKINS.
RESILIENT TIRE.
APPLICATION FILED NOV. 22, 1918.

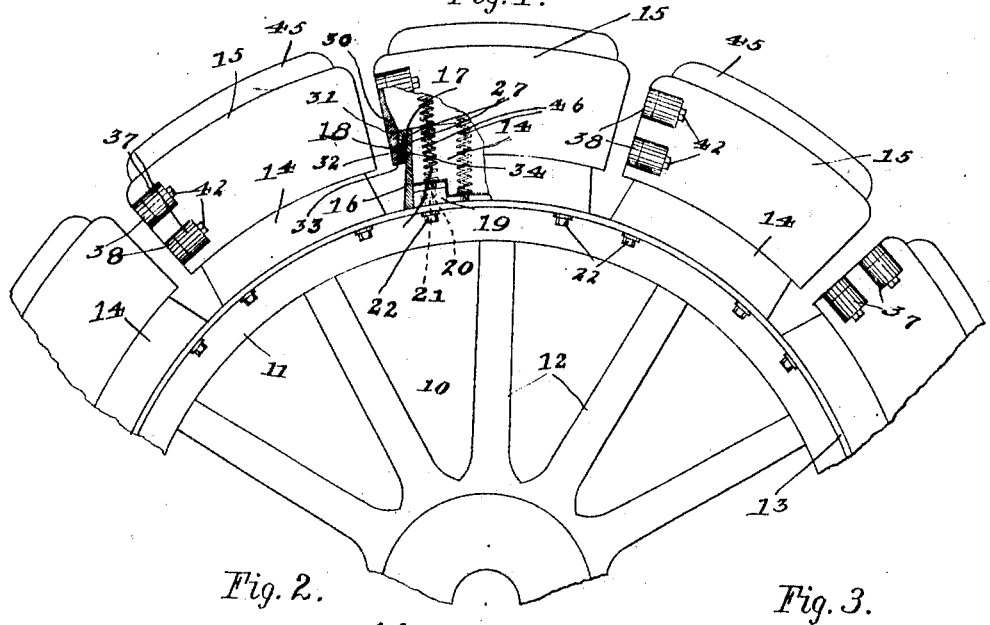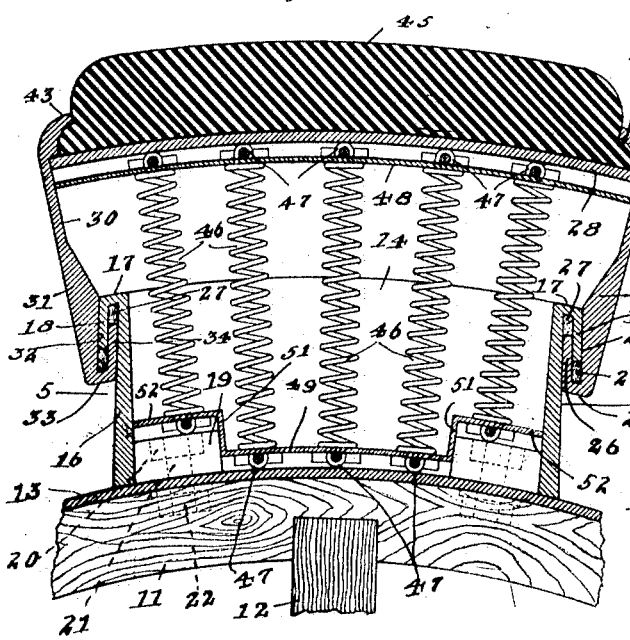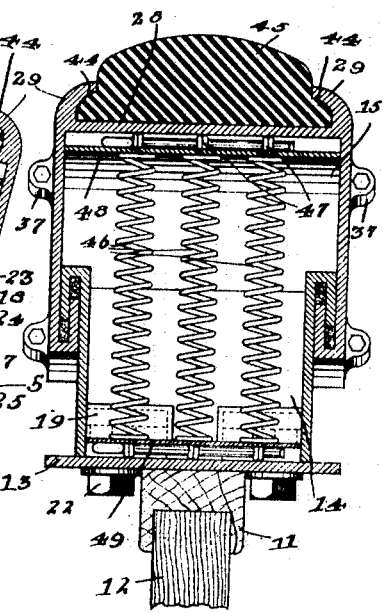

1,315,837.

Patented Sept. 9, 1919.
3 SHEETS—SHEET 2.

Inventor
C. E. Hopkins

Victor J. Evans
Attorney

C. E. HOPKINS.
RESILIENT TIRE.
APPLICATION FILED NOV. 22, 1918.
1,315,837.
Patented Sept. 9, 1919.
3 SHEETS—SHEET 3.
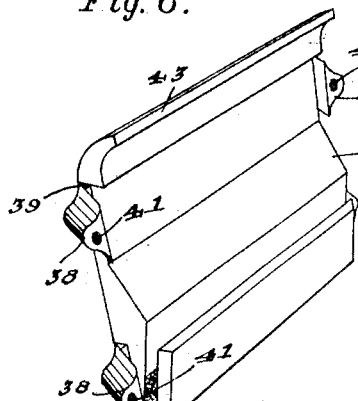
Fig. 6.
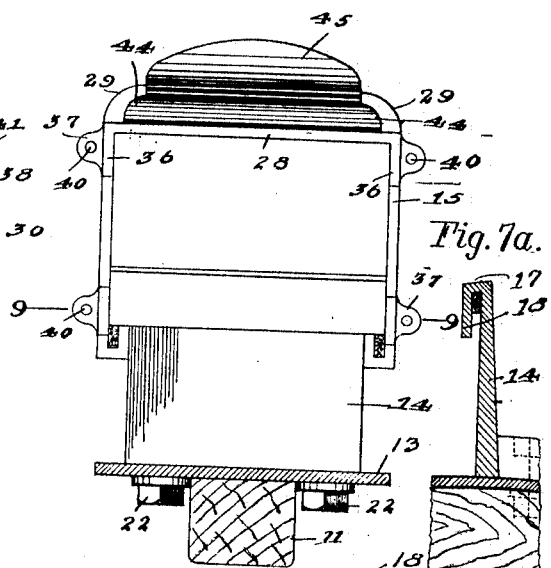
Fig. 7.
Fig. 7a.
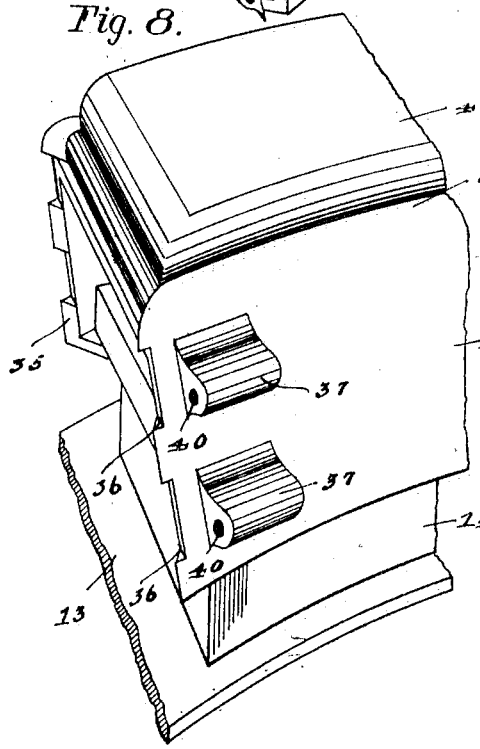
Fig. 8.
Fig. 9.
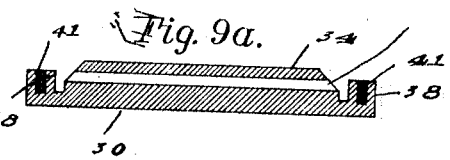
Fig. 9a.
Inventor
C. E. Hopkins
Victor J. Evans
Attorney

UNITED STATES PATENT OFFICE.

CHARLES E. HOPKINS, OF WASHINGTON, DISTRICT OF COLUMBIA.

RESILIENT TIRE.

1,315,837.     Specification of Letters Patent.     Patented Sept. 9, 1919.

Application filed November 22, 1918. Serial No. 263,746.

*To all whom it may concern:*

Be it known that I, CHARLES E. HOPKINS, a citizen of the United States, residing at Washington, in the District of Columbia, have invented new and useful Improvements in Resilient Tires, of which the following is a specification.

This invention relates to a resilient wheel tire, and has for its primary object to produce a tire comprising a series of separated shoes arranged concentrically around the rim of the wheel, each of said shoes comprising an inner fixed member and an outer movable member with spring means therebetween for normally retaining the outer member a determined distance from the inner member as well as for absorbing the pressure between the members when the shoes are brought to ground contacting position.

A further object of the invention is to produce a resilient tire for vehicles comprising a series of separated shoes which are arranged concentrically around the rim of a wheel, each of said shoes acting independently when brought to ground contacting position to produce a desired yielding or cushioning action for the wheel, and in addition to this serving as calks to increase traction between said wheel and said ground surface.

It is a still further object of the invention to produce a resilient tire for wheels constituting a series of shoes arranged concentrically around the rim of the wheel and separated from each other, each of said shoes comprising an inner fixed section and an outer movable section having spring tensioning means therebetween and said sections having interengaging means therebetween for preventing the entrance of dust or moisture therein.

It is a still further object of the invention to produce a resilient tire for vehicle wheels to produce a series of shoes arranged concentrically around the rim of the wheel, each of said shoes comprising a plurality of interengaging sections having spring tensioning means therebetween, the said shoes being of such a construction as to permit of the arrangement thereof upon any vehicle wheel of an ordinary construction.

It is a still further object of the invention to produce a resilient tire for vehicle wheels comprising a series of separated shoes arranged concentrically around the rim of the wheel and secured to said rim, each of said shoes comprising an inner section which is removably secured to the rim of the wheel, and an outer section which is telescopically arranged upon the inner section and which is provided with means interengaging the means on the said inner section for insuring a dust proof joint between the sections; the outer section is provided with a removable end whereby access may be obtained to the interior of both of the sections and also whereby the outer section may be readily separated from the inner section. A plurality of helical springs having their ends removably connected to plates which constitute a cage for said springs being arranged in the shoe and insuring the proper spaced relation between the sections of the shoe, and the shoe having upon its outer surface a removable compressible tread member.

It is a still further object of the invention to simplify and improve the existing art by producing a resilient tire for vehicle wheels comprising a series of separated shoes arranged concentrically around the rim of the tire, having means for removably attaching said shoes to said rim, each of said shoes comprising spring influenced telescopic sections having a compressible tread member thereon and being so constructed and arranged as to permit of the removal or application of the said tread, access to the interior for the adjustment or replacing of any of the springs therein, the ready separation of the outer section from the inner section and the ready removal of both sections from the tire rim.

Other objects and advantages will present themselves as the nature of the invention is better understood, reference being had to the accompanying drawings, in which:

Figure 1 is a side elevation of a portion of a wheel provided with the improvement, parts being broken away and parts being in section.

Fig. 2 is an approximately central longitudinal sectional view, upon an enlarged scale through one of the shoes secured on the rim of the wheel, Fig. 3 is an approximately central transverse sectional view through the shoe illustrated in Fig. 2.

Fig. 6 is a perspective view of the detachable end for the outer shoe section.

Fig. 7 is an end elevation of one of the shoes with the detachable end for the outer section thereof removed.

Figure 4:
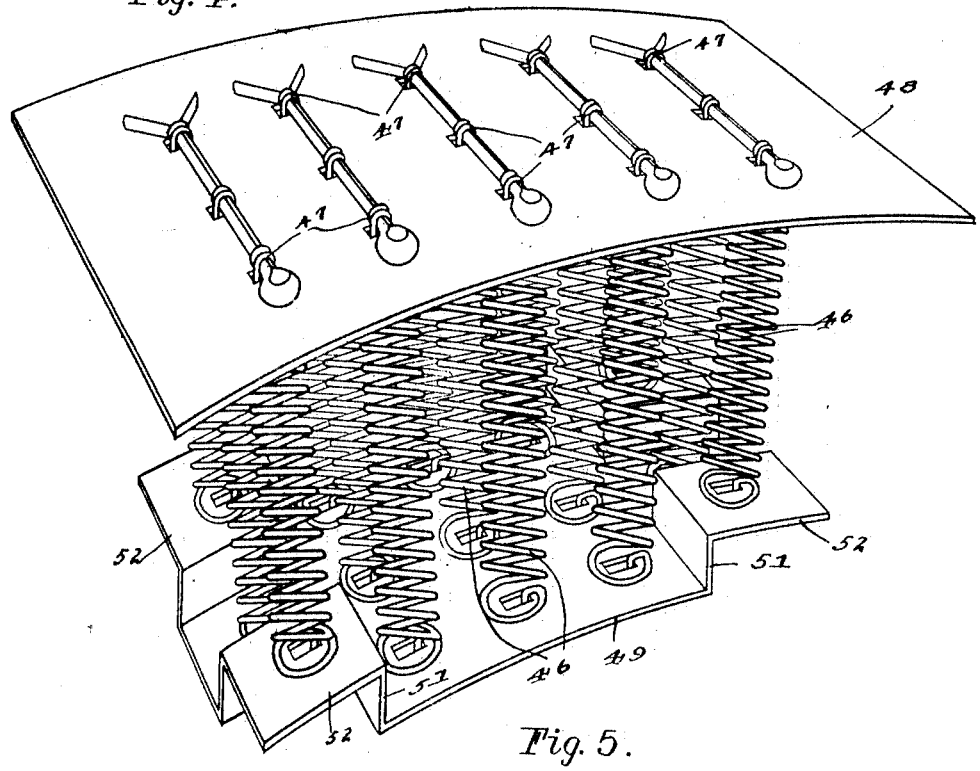
Fig. 4 is a perspective view of the spring cushioning means for each of the shoes.
Figure 5:
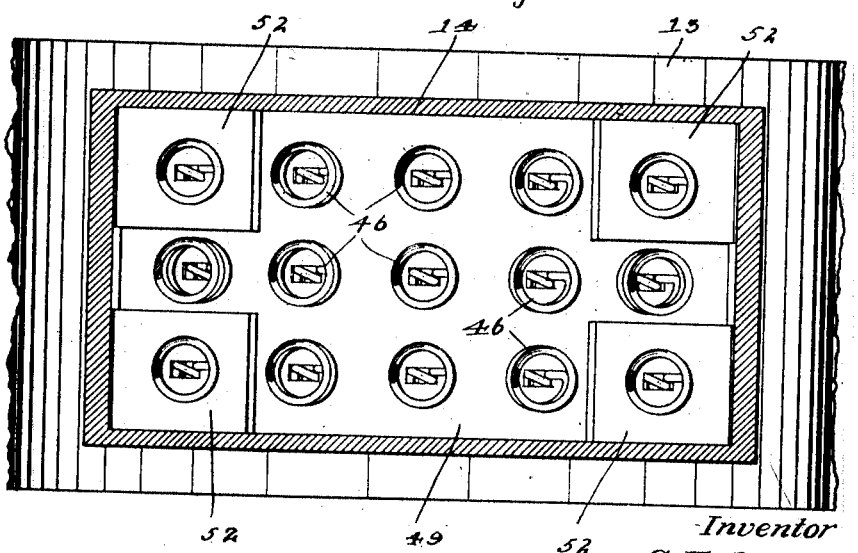
Fig. 5 is an enlarged sectional view approximately on the line 5—5 of Fig. 2.

Fig. 7ª is a fragmentary sectional view through one of the ends of the inner section of the shoe, the tire rim being in section.

Fig. 8 is a perspective view of a portion of one of the shoes, the end plate being removed.

Fig. 9 is a detail horizontal sectional view approximately on the line 9—9 of Fig. 7.

Fig. 9ª is a sectional view through the lower and lipped portion of the removable end.

Referring now to the drawings the numeral 10 designates a portion of a vehicle wheel having the felly 11 connected to the outer ends of the spokes 12 thereof, and secured on the felly is the rim 13. In the present instance the rim 13 is of a materially greater width than that of the felly 11, extending an equi-distance from the sides of the said felly.

My improved resilient tire comprises a series of telescopic members arranged concentrically around the rim 13 of the wheel, but separated or spaced away from each other so that each of the members will act independently of the other members. The members are in the nature of shoes, and will hereinafter be so termed, and as each of the shoes is of a similar construction a description of one may be understood as applicable to the remainder.

Each of the shoes includes an inner section 14 and an outer section 15 which is slidable upon or telescopic with respect to the inner section.

Each of the inner sections 14 comprises a hollow box-like member, the side walls of which being preferably, but not necessarily, of a less thickness than the end walls. The end walls are preferably gradually increased in thickness upon the inner surfaces thereof from the open top to the open bottom of the said sections, and these end walls are indicated, for distinction by the numeral 16.

Each of the inner sections 14 has its outer edge provided with a continuous outstanding flange 17, and the said flange, from its outer edge is formed with a depending flanged portion which I shall term a lip and which is designated by the numeral 18. The inner section, upon the inner corners thereof is integrally formed with substantially rectangular lugs 19 that have openings therethrough which register with similar openings in the wheel rim 13. Preferably the lugs have their outer faces formed with depressions which surround the referred to openings, the said depressions corresponding to the shape of and designed to receive therein the heads 20 of bolts 21. The co-engagement of the heads of the bolts with the walls of the depressions hold the same against accidental turning, and the threaded shanks of the bolts extend inwardly of the rim 13 and have screwed thereon nuts 22. By this arrangement it will be seen that the sections 14 are removably connected to the rim 13, and that the said rim forms the bottom wall of the said sections.

Each of the outer sections of the shoe members is open at its inner face and at one of the ends thereof. The side walls of the outer sections are preferably of an equal thickness throughout, while the end wall is preferably thickened upon its inner face adjacent to the inner and open end of the section. The ends of the section 15 are arranged at an outward angle from their inner to their outer surfaces, and the thickened portion, heretofore referred to, and indicated by the numeral 23 provides a straight inner surface 24 that contacts with the outer straight surface of the lip 18 on one end of the section 14. The section 15, at its inner and open portion is provided with an inturned flange 25, the said flange terminating in an upwardly extending flange which provides what I will term a lip 26, and the said lip is designed to co-engage with the lip 18 of the section 14. In the spaces between the co-engaging lips of the respective sections are arranged compressible gaskets 27 which insure both a dust and water proof joint between the sections. A lubricant may be applied to the contacting parts of the shoe sections.

The section 15 is provided with a curved top plate 28, and both the sides and end of the said section have an inturned flange 29 which overlies the said top 28.

For the open end of the outer section 15, I provide a closure plate 30. This plate, in cross section corresponds to the shape of the closed end of the section, being widened or thickened upon its inner face adjacent to its inner edge as indicated by the numeral 31, providing an inner straight wall 32 which engages with the outer straight surface of the lip or tongue 18 on one end of the section 14. The inner end of the plate 30 is flanged inwardly as at 33, and from thence flanged outwardly as at 34, the last mentioned flange providing a lip or tongue that is designed to be received in the space between the lip or tongue 18 and the end wall of the section 14. A gasket is arranged in the space of groove between the end member 30 and the lip or tongue thereon. The sections 15 have their sides, at their open ends cut at an inward inclination as indicated by the numerals 35, and the said cut portions are provided with spaced notches 36. The sides inward of, but in a line with the notches are formed with outstanding ears 37, and the ends of the removable plate 30 are provided upon the sides thereof with inwardly extending ears 38. The plates 30 have their ends cut at an inclination to receive the inclined ends 35 of the sides 15 of the outer section of the shoe, whereby a miter joint is provided at the corners of the shoe when the plate 30 is secured thereon. The ends of the said plate 30 have formed thereon inwardly extending ears 38 designed to be received in the notches 36 and to have their inner ends contact with the ends of the ears 37. Each of the ears 37 has an opening 40 therethrough arranged to register with the respective threaded depressions 41 in the ears 38 of the plate 30. These alining openings and depressions are designed to receive the shanks of headed bolts 42, whereby the plate 30 is removably secured on the section 15.

The plate 30, at the upper end thereof is provided with an inturned flange 43, the ends of which being cut at an angle to snugly engage with the angle ends of the flanges 29. The flanges 29 and 43 are designed to engage with a continuous bead 44 formed upon the inner portion of a compressible tread 45.

Before the shoe sections are assembled I arrange in the hollow bodies thereof the spring means for normally sustaining the outer sections 15 in proper outward position with respect to the inner and fixed sections 14. This means includes any desired number of preferably equally spaced series of helical springs 46. In the showing of the drawings three longitudinally arranged series of springs are illustrated, but it is to be understood that any desired number of series may be employed and also that the springs may be of any desired strength for performing the functions required of them. Each of the springs 46 has its ends extended and bent to provide eyes 47, and these eyes pass through openings in the outer plate 48 and through openings in an inner plate 49. The plates provide what may be termed the cage for the springs, and the transversely alining series of springs are secured to the plates of the cage through the medium of transversely arranged cotter pins 50 passing therethrough, the ends of the said pins being spread when thus engaging the springs.

The inner plates 49 have their corners depressed and the edges provided by the said depressions formed with outstanding flanges 51 which are connected by a horizontal plate or flange 52. As a consequence the corner springs 46 are of a less length than the remaining springs, and separate and short cotter pins are employed for securing the said corner springs and the end springs, between the said corner springs to the inner plate of the cage.

By notching or providing the corners of the inner plates 49 of the spring cages, and flanging the same, as above described, the said inner plates will snugly engage with the lugs 19 on the inner corners of the inner shoe sections, and consequently no additional means may be required for retaining the springs in the shoes.

Each of the shoes, when brought to ground contacting position has its telescopic section compressed against the tension of its springs. Such inward movement is, of course, varied by the load on the vehicle, but in all events is comparatively slight while at the same time sufficient to absorb or compensate for the shock incident thereto, so that the improvement embodies all of the desired features of a pneumatic tire and entirely overcomes the disadvantages of such a tire. Each of the shoes provides what may be termed an independent calk for the wheel and consequently increases the traction between the ground surface and the wheel. The end plates of the outer sections of the shoes may be readily removed, and by so doing a worn tread 45 may be likewise removed. The entire shoe may be likewise easily removed from the rim by unscrewing the nuts 22, and with the end plate removed the outer section may be readily slid off of the inner section so that the spring cage may be removed and new springs readily arranged in the cage to replace damaged or ineffective springs. The shoes are thickened, and consequently reinforced at the ends thereof, which parts are most susceptible to shock and wear, so that these contingencies are compensated for. Lateral or end movement in a longitudinal direction of the outer sections of the shoes on the inner or thick sections thereof is entirely overcome, and it is thought, from the foregoing that the simplicity, cheapness and efficiency of the construction will be apparent without further description.

Having thus described the invention, what is claimed as new is:—

1. A resilient wheel tire, comprising a plurality of spaced shoes arranged concentrically around the rim of a wheel out of contacting relation with each other, each of said shoes comprising an inner fixed section and an outer section telescopic over the inner section, interengaging tongues and grooves at the confronting edges of the sections, compressible gaskets in said grooves, spring means between the sections and each of the outer sections having a removable end.

2. A resilient wheel tire, comprising a series of spaced shoes arranged concentrically around the rim of a wheel, each of said shoes comprising inner and outer telescopic sections which are hollow, the inner section having lugs on the inner corners thereof, removable means passing through the rim of the wheel and said lugs for securing the inner section on the rim, said inner section having its outer edge provided with an offset terminating in an inturned continuous tongue, the outer section having its inner edge offset and provided with a continuous tongue engaging between the tongue and the inner section, compressible gaskets between the tongues and the offset portions of the sections, spring expansion means between the sections, and a compressible tread on the outer section.

3. A resilient wheel tire, comprisng a series of spaced shoes arranged concentrically around the rim of a wheel, each of said shoes comprising hollow telescopic sections having interengaging means therebetween, and gaskets for said interengaging means, lugs formed on the inner corners of the inner section, bolts passing through the rim and engaging said lugs, a series of expansion springs between the sections having their ends formed with eyes, plates having openings to receive the eyes, removable elements passing through the eyes for securing the springs to the plates, the inner plate having its corners notched and flanged to engage with the lugs of the inner shoe section, the outer shoe section having an open end and a continuous inturned flange over the top wall thereof, a beaded compressible tread received in the flanges, a plate for closing the open end of the section having a flange to engage with the bead of the tread, and removable means for securing said plate to said section.

4. A resilient wheel tire comprising a plurality of shoes arranged concentrically around the rim of a wheel and spaced away from contacting engagement with each other, each of said shoes comprising an inner fixed section and an outer section telescopic over the inner section, spring means between said sections, interengaging means between the sections, compressible means between said interengaging means, the outer section having an open end, lugs on the sides thereof at the said open end, a removable end plate having lugs thereon co-engaging with the lugs of the said section, removable means connecting said lugs, and interengaging means between said plate and the fixed section.

5. A resilient wheel comprising a plurality of shoes arranged concentrically around the rim of a wheel and disposed away from contacting engagement with each other, each of said shoes comprising an inner fixed section and an outer section telescopic over the inner section, spring means between said sections, interengaging means at the confronting ends of said sections, the outer section having an open end, and the side walls thereof at the said open end being beveled and notched and provided on their outer faces with spaced lugs disposed opposite the notches, a removable end plate having its edges beveled to engage with the beveled surface of the said outer section, lugs formed on the edges of the said removable plate designed to pass through the notches and to contact with the lugs on the said outer section, and removable means connecting said lugs.

In testimony whereof I affix my signature.

CHARLES E. HOPKINS.

Copies of this patent may be obtained for five cents each, by addressing the "Commissioner of Patents, Washington, D. C."